United States Patent Office

3,342,610
Patented Sept. 19, 1967

---

3,342,610
METHOD AND COMPOSITION FOR PRESERVATION OF MUSHROOMS
Clinton Clair Molsberry, 15763 96th Ave.,
Surrey, British Columbia, Canada
No Drawing. Filed Dec. 2, 1963, Ser. No. 327,509
7 Claims. (Cl. 99—154)

This invention relates to the preservation of vegetables. More particularly, it relates to the preservation of skinless surfaces of vegetables, and specifically to the preservation of mushrooms and to a method and composition for producing preserved mushrooms.

The advantages to be derived from the marketing of vegetables having skinless surfaces, in this case, mushrooms, as for example in sliced, sectioned or similar condition, have become increasingly apparent to all concerned, including the food processing and retailing trades and the ultimate consumers. These advantages are particularly apparent in connection with the preparation of mushrooms with reference to slicing, sectioning, freezing and canning. There are many additional advantages, for example, to retailer for sale or display purposes, to restaurants or hotels in order to save time and labour in preparing meals, elimination of waste because of the adaptibility of the product to refrigeration.

It is of course well known that mushrooms, even under refrigeration, are very subject to discoloration, flavour loss and premature spoilage particularly where they are sliced or cut up for packing purposes.

The present invention provides a satisfactory answer to the problems of discoloration, flavor loss and premature spoilage in mushrooms.

The achievements of these objects is made possible by the applicants discovery that by using novel chemical compositions and method in the processing of mushrooms, their flavor is locked in and the discoloration and premature spoilage are eliminated or at least sharply reduced.

The mushrooms are treated initially in a sealer composition consisting essentially of a mixture of three inorganic salts, analytical data showing the following composition: sodium sulphate (anhydrous) 27.5% by weight; disodium phosphate (anhydrous) 25.8% by weight, and sodium metabisulphite 45.7% by weight. These compounds are preferred, being readily soluble or dispersible in selected liquid media.

In addition to the sealer there is a bleaching mixture of the following composition: sodium sulphate (anhydrous) 27.3% by weight, sodium chloride 29.0% by weight and sodium metabisulphite 41.7% by weight.

The preferred liquid medium selected for application is water.

The following specific steps in the process are illustrative of the invention as described above.

Step 1

The mushrooms are dipped in an aqeous solution containing 1½ ounces of the sealer composition mixed with 6 gallons of water, and left in the solution for 1 to 1½ minutes.

Step 2

The mushrooms are dipped in an aqueous solution containing 3 ounces of the bleaching mixture mixed with 6 gallons of water and left in that solution from 3 to 4 minutes.

Step 3

The mushrooms are sliced or cut into pieces.

Step 4

The mushroom slices or pieces are then given a further treatment according to step 1 above.

Step 5

The mushroom slices or pieces are then given a further dipping and soaking according to step 2 above.

The foregoing five steps follow each other in rapid sequence and afterwards the mushrooms are subjected to flash freezing or refrigeration for 3 to 4 minutes and are then placed under ordinary refrigeration. During processing the mushrooms increase in weight by about 15 or 20 percent.

Other advantages of the foregoing processes have been established by the Research Branch of the Department of Agriculture where it was found on examination that the treated raw mushrooms had an $SO_2$ residual of only 74 parts per million; well below the required $SO_2$ residual count recorded as being suitable for distribution and public consumption.

When the mushrooms treated according to the invention are fried or otherwise cooked they are found to be of excellent flavor and color and to contain the insignificantly low $SO_2$ residual count of 8 parts per million.

I claim:

1. A composition for treating mushrooms to retain their delicate texture and flavor, the composition comprising a mixture of sodium sulphate (anhydrous) 27.5% by weight, disodium phosphate (anhydrous) 25.8% by weight and sodium metabisulphite 45.7% by weight.

2. A composition for treating mushrooms to retain their delicate texture and flavor comprising .1% by weight of the composition according to claim 1, and 6% by weight of water.

3. A composition for treating mushrooms to eliminate deterioration by discoloration, comprising a mixture of sodium sulphate (anhydrous) 27.3% by weight, sodium chloride 29.0% by weight and sodium metabisulphite 41.7% by weight.

4. A composition for treating mushrooms to eliminate deterioration by discoloration by dipping in an aqeous solution comprising .3% by weight of the chemical formula in claim 3 and 6% by weight of an inert liquid medium.

5. Compositions for successively treating mushrooms to eliminate loss of flavor, discoloration and premature spoilage, the compositions for successive treatment comprising the following mixtures;
   (A) sodium sulfate (anhydrous) 27.5% by wt., disodium phosphate (anhydrous) 25.8% by wt., sodium metabisulfite 45.7% by wt.;
   (B) sodium sulfate (anhydrous) 27.3% by wt., sodium chloride 29.0% by wt., sodium metabisulfite 41.7% by wt.

6. A process of treating mushrooms to elimate loss of flavor and to prevent discoloration and premature spoilage comprising the following series of steps; (1) immersing the mushrooms for 1 to 1½ minutes in an aqueous sealing solution consisting of a mixture of inorganic salts comprising anhydrous sodium sulfate 27.5% by weight, anhydrous disodium phosphate 25.8% by weight and sodium metabisulfite 45.7% by weight; (2) removing the mushrooms and immersing them for 3 to 4 minutes in an aqueous bleaching solution consisting of a mixture of salts comprising anhydrous sodium sulfate 27.3% by weight, sodium chloride 29.0% by weight and sodium metabisulfite 41.7% by weight; (3) slicing or chopping the mushrooms; (4) subjecting the sliced or chopped mushrooms to a repetition of step (1); and (5) subjecting the sliced or chopped mushrooms to a repetition of step (2), the steps following in rapid sequence, and at the conclusion of step (5) subjecting the mushrooms to flash freezing followed by ordinary refrigeration.

7. The process according to claim 6 where the sealing solution of step (1) is made up of 1½ ounces of the salt mixture in 6 gallons of water and the bleaching solution of step (2) is made up of 3 ounces of the salt mixture and 6 gallons of water.

References Cited

UNITED STATES PATENTS

| | | | |
|---|---|---|---|
| 2,628,905 | 2/1953 | Antle et al. | 99—154 |
| 2,635,051 | 4/1953 | Di Giacinto | 99—154 X |

OTHER REFERENCES

Latimer et al.: Reference Book of Inorganic Chemistry, Macmillan Co., 6th ed., 1952, page 230.

Rideal: Disinfection and the Preservation of Food, 3rd ed., Sanitary Publ. Co., London, 1903, page 128.

A. LOUIS MONACELL, *Primary Examiner.*

M. VOET, *Assistant Examiner.*